(12) United States Patent
Radel et al.

(10) Patent No.: US 7,752,234 B2
(45) Date of Patent: Jul. 6, 2010

(54) METHOD AND APPARATUS FOR AUDITING UTILITY POLES

(75) Inventors: William A. Radel, Gardner, KS (US); Dana Morris, Leawood, KS (US); Eric Chaitman, Edgerton, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 337 days.

(21) Appl. No.: 11/888,089

(22) Filed: Jul. 31, 2007

(65) Prior Publication Data

US 2009/0037485 A1   Feb. 5, 2009

(51) Int. Cl.
G06F 7/00 (2006.01)
(52) U.S. Cl. .................. 707/802; 707/805; 707/770; 705/1; 705/26; 705/40; 702/188
(58) Field of Classification Search .................. 707/1, 707/3, 5–6, 100, 802, 805, 770; 705/1, 3, 705/8, 11, 26, 37, 40; 702/188
See application file for complete search history.

(56) References Cited

U.S. PATENT DOCUMENTS

| | | | | |
|---|---|---|---|---|
| 5,099,348 | A * | 3/1992 | Huddleston et al. | 398/107 |
| 5,517,644 | A * | 5/1996 | Murdock | 705/8 |
| 6,968,295 | B1 * | 11/2005 | Carr | 702/188 |
| 7,519,589 | B2 * | 4/2009 | Charnock et al. | 707/5 |
| 7,523,053 | B2 * | 4/2009 | Pudhukottai et al. | 705/30 |
| 2002/0035432 | A1 * | 3/2002 | Kubica et al. | 702/5 |
| 2002/0056501 | A1 * | 5/2002 | Bingel et al. | 156/64 |
| 2004/0078231 | A1 * | 4/2004 | Wilkes et al. | 705/2 |
| 2004/0249676 | A1 * | 12/2004 | Marshall et al. | 705/2 |
| 2005/0102534 | A1 * | 5/2005 | Wong | 713/201 |
| 2005/0144182 | A1 * | 6/2005 | Boris et al. | 707/100 |
| 2006/0089861 | A1 * | 4/2006 | King et al. | 705/4 |
| 2006/0106686 | A1 * | 5/2006 | King et al. | 705/30 |
| 2006/0155865 | A1 * | 7/2006 | Brandt et al. | 709/230 |
| 2006/0241991 | A1 * | 10/2006 | Pudhukottai et al. | 705/8 |
| 2006/0271526 | A1 * | 11/2006 | Charnock et al. | 707/3 |
| 2007/0156495 | A1 * | 7/2007 | King | 705/8 |
| 2007/0255656 | A1 * | 11/2007 | Olson et al. | 705/40 |

(Continued)

OTHER PUBLICATIONS

Major Barry D. Guyse—"RMS 1977—Encouraging Management Growth and Productivity" http://www.airpower.maxwell.af.mil/airchronicles/aureview/1978/sep-oct/guyse.html—1997 (pp. 1-5).*

(Continued)

*Primary Examiner*—John E Breene
*Assistant Examiner*—Anh Ly
(74) *Attorney, Agent, or Firm*—Matthew P. Harlow

(57) ABSTRACT

An apparatus and method for managing utility pole information is provided in the illustrative embodiments. A method for managing the utility pole information may include creating several audit forms and searching those forms for an audit of a selected pole. The method may further include pre-populating the audit form with data from a repository of engineering work orders. The method may further include recording general pole information, a pole inspection information, a pole test information, a first attachment information, and inspector's notes about the selected pole on the audit form resulting in an updated audit form. The method may then transfer the updated audit form to a repository of utility poles audit information.

17 Claims, 6 Drawing Sheets

U.S. PATENT DOCUMENTS

2007/0265901 A1* 11/2007 Olson et al. .................... 705/8
2008/0040207 A1* 2/2008 McKay et al. ................ 705/11
2008/0183519 A1* 7/2008 King et al. ..................... 705/7
2009/0193001 A1* 7/2009 Boris et al. .................... 707/3

OTHER PUBLICATIONS

Federal Highway Admisnistration—"Utility relocation and accommodation on ferederal-aid highway projects"—sixthe edition Jan. 2003 (pp. 1-100).*

* cited by examiner

Figure 4A

- 400
  - Searchable color-coded hierarchical organization of poles
    402
  - General information about a selected pole
    404
  - Information about attachments on the selected pole
    408
  - Pole audit/inspection information and data from any tests performed on the pole
    406
  - Auditor/inspector's notes and actions to be taken on the pole
    410

Figure 4C

- 450
- 452: Wire Center 1, Region 1, Region 2, Pole 1, Pole 2, Pole 3, Pole 4, Region 3, Region 4
- 454: Company, Foreign
- 456: Inspection date, Inspector name, Height, Class, Material, Yr. Installed, GPS location: Lat., Long., Tests (Test 1, Test 2, Test 3)
- Tabs: Gen. Audit, Attachments (458), Notes (460)

METHOD AND APPARATUS FOR AUDITING UTILITY POLES

BACKGROUND

1. Field of the Invention

The principles of the present invention relate generally to managing information, and in particular, to managing assets audit information. Still more particularly, the principles of the present invention relate to a method and apparatus for managing audit information about utility poles.

2. Description of the Related Art

Utility providers, such as telephone service providers, electricity providers, and cable television (CATV) providers, generally provide their respective utilities using wires and cables, collectively called cables. These cables can be buried underground or can remain above ground.

When the utility cables remain above ground, they are generally strung across a series of utility poles, commonly referred to as a "pole" or "poles," erected some distance from one another. In certain instances, a utility provider may mount the provider's cables and other equipment on the provider's own poles. In other instances, a utility provider may mount the provider's cables and other equipment on another provider's pole. When a utility provider uses another provider's poles in this manner, each of the provider's cables and equipment is called an "attachment" to the pole.

Utility providers charge each other for attachments to their poles. For example, a telephone company may charge the electric company when the electric company attaches an electric power cable attachment and a transformer attachment to one of the telephone company's poles. A specific pole owned by a specific utility provider may have several attachments attached to the pole, and several utility providers may own those several attachments. Utility providers generally enter into agreements to use each other's poles for their attachments, and bill each other for that use.

Utility poles are generally subject to regulatory controls. The regulatory controls are exercised by one or more regulatory authorities. A regulatory authority may assert its jurisdiction over a specific pole based on a number of factors, including jurisdiction over the physical location of the pole, the specific use of the pole, and the nature of the industry using the pole.

Utility providers have an interest in maintaining their poles in good working condition so that their utilities can be provided without disruption. The utility providers also have an interest in maintaining their poles in compliance with the applicable regulations as required by the governing regulatory authorities as described above. Generally, the utility providers maintain personnel to check and repair their infrastructure, which includes the poles. Pole auditors, also known simply as auditors, are persons who perform audits of utility poles. An audit of utility poles is checking the status of the utility poles, compliance of the utility poles with specifications, regulations, industry standards, and utility provider's criteria.

Presently, auditors use either a paper-based method of auditing, or a simplistic data entry system based method of auditing. In the paper-based method, the auditors simply record the audit information when at a utility pole, and the information on the paper is used for any actions at a later time. In the simplistic data entry systems, a software application, such as a forms based system, is used for entering the data that would otherwise be recorded on paper as described above. The software application makes that entered data available for later use. However, neither of these methods provides an auditor any previously known or planned information about utility poles they are about to audit.

Presently, any modifications to a utility pole, such as for adding or changing equipment, or for responding to a service disruption, such as from a storm, have to be communicated to the auditor through additional paperwork. Thus, the present method and tools for auditing are insufficient for providing accuracy of information, for continuity of information between work performed at various times on a utility pole, and for verification of the results of such work.

SUMMARY OF THE INVENTION

The illustrative embodiments provide an apparatus and methods for managing utility pole information. An apparatus and method for managing utility pole information is provided in the illustrative embodiments. A method for managing the utility pole information may include creating several audit forms and searching those forms for an audit of a selected pole. The method may further include pre-populating the audit form with data from a repository of engineering work orders. The method may further include recording general pole information, a pole inspection information, a pole test information, a first attachment information, and inspector's notes about the selected pole on the audit form resulting in an updated audit form. The method may then transfer the updated audit form to a repository of utility poles audit information.

An apparatus and a method for managing utility pole information may include having a first database to manage information associated with several utility poles. A first processing unit may extract at least a portion of the information in the first database. A second database may be in communication with the first processing unit, and store the information extracted from the first database. A second processing unit may further be in communication with the second database and execute a software program for displaying a graphical user interface to a user to verify and update the utility pole information stored in the second database.

A method for auditing utility poles may include selecting a utility pole from several utility poles arranged according to a plurality of wire centers. The method may further include finding an audit form associated with the utility pole, the audit form being either a new audit form or an in-progress audit form. The new audit form may have a set of data fields pre-populated from information about the utility pole existing in a repository of engineering work orders. The method may update the audit form with updated information about the utility pole, resulting in an updated audit form. The updated audit form may then be transmitted to a repository of utility poles audit information.

BRIEF DESCRIPTION OF THE DRAWINGS

The novel features believed characteristic of the illustrative embodiments are set forth in the appended claims. The illustrative embodiments, however, as well as a preferred mode of use, will best be understood by reference to the following detailed description of an illustrative embodiment when read in conjunction with the accompanying drawings, wherein:

FIG. 4A depicts a schematic layout of a client side graphical user interface (GUI) in accordance with an illustrative embodiment;

FIG. 4C depicts an exemplary detailed layout of a client side GUI in accordance with an illustrative embodiment;

DETAILED DESCRIPTION OF THE DRAWINGS

Figure 1:
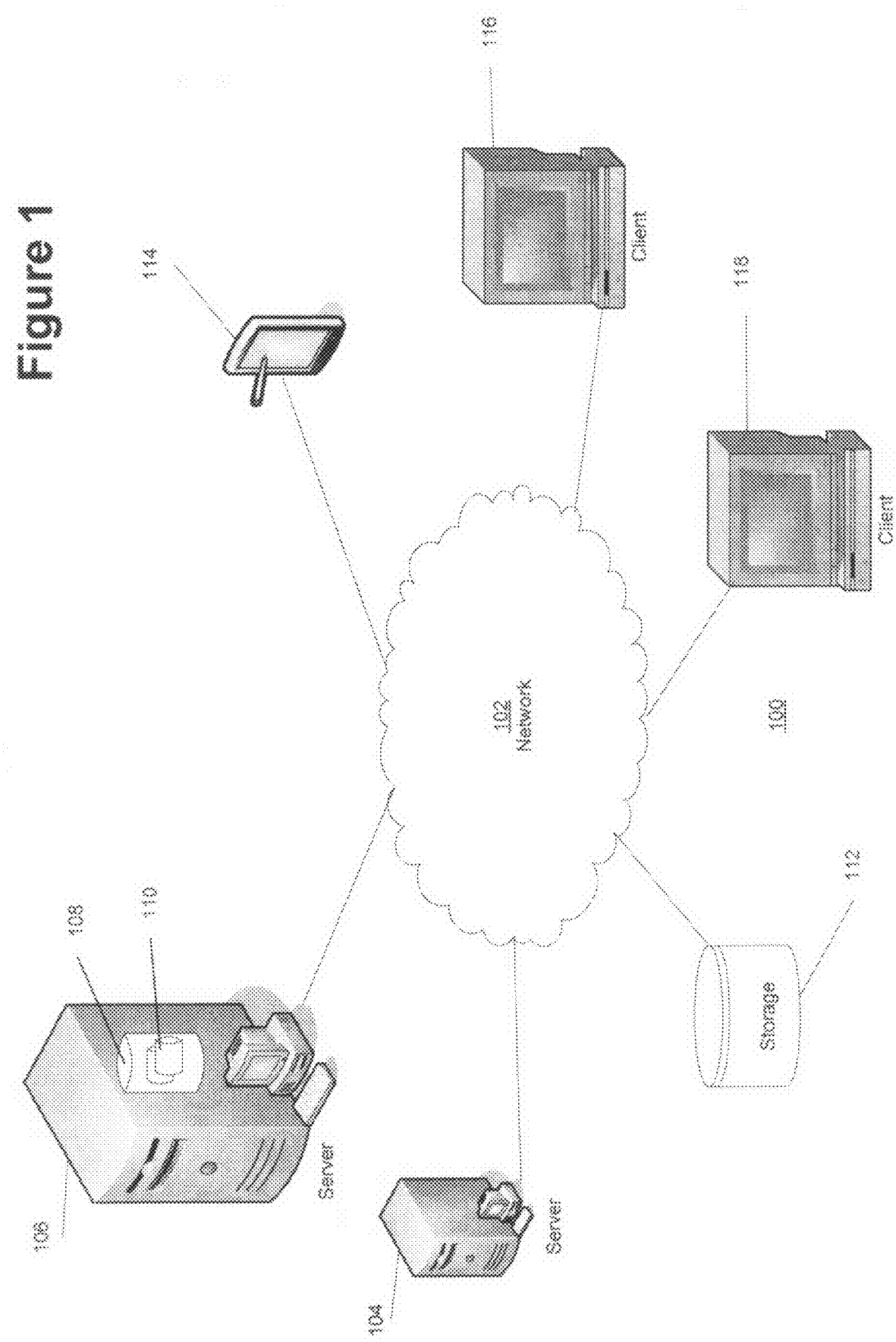
FIG. 1 depicts a pictorial representation of a network of data processing systems in which illustrative embodiments may be implemented.

With reference to the figures, and in particular with reference to FIG. 1, an exemplary diagram of a data processing environment is provided in which illustrative embodiments may be implemented. FIG. 1 is not intended to assert or imply any limitation with regard to the environments in which different embodiments may be implemented. Many modifications to the depicted environment may be made.

With reference to FIG. 1, this figure depicts a pictorial representation of a network of data processing systems in which illustrative embodiments may be implemented. Network data processing system 100 is a network of computers in which the illustrative embodiments may be implemented. For example, a pole auditing application in accordance with an illustrative embodiment may use a number of computers storing pole and audit information, processing such information, and communicating with each other in the manner of the description of FIG. 1 for an improved auditing process in accordance with an illustrative embodiment.

Network data processing system 100 contains network 102, which is a communications medium used to provide communications links between various devices and computers connected together within network data processing system 100. Network 102 may include connections, such as wire, wireless communication links, or fiber optic cables. For example, Network 102 may include wire connections of a public switched telephone network (PSTN). Network 102 may be a data network or a telecommunications network.

In the depicted example, server 104 and server 106 connect to network 102. A server, such as server 106, may include storage unit 108, which may include one or more databases 110. A database, such as database 110 may include a engineering work order records database for work to be performed on utility poles. Database 110 may additionally, or alternatively, be an audit database that includes records of utility pole audits that have been performed. Utility pole audit records may be derived from a combination of one or more databases, such as database 110, in a utility pole auditing system in accordance with an illustrative embodiment.

Additionally, other storage units, such as storage unit 112, may also be distributed across network 102. In addition, clients 114, 116, and 118 connect to network 102. Clients 114, 116, and 118 may be, for example, portable computing devices, personal computers, or network computers. For example, client 114 is depicted as being a portable computing device in which a utility pole auditing system according to an illustrative embodiment may be implemented and carried by an auditor in the field. For example, client 114 may be a mobile phone, Blackberry™ or another smart phone, a personal digital assistant (PDA) or a similar device. Blackberry™ is registered trademark of Research In Motion (RIM). Furthermore, client 114 may include communication capabilities, such as a wired or wireless modem, for communicating with network 102, such as for downloading or uploading audit information from database 110, or another database in storage unit 112.

In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 may be the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, including thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
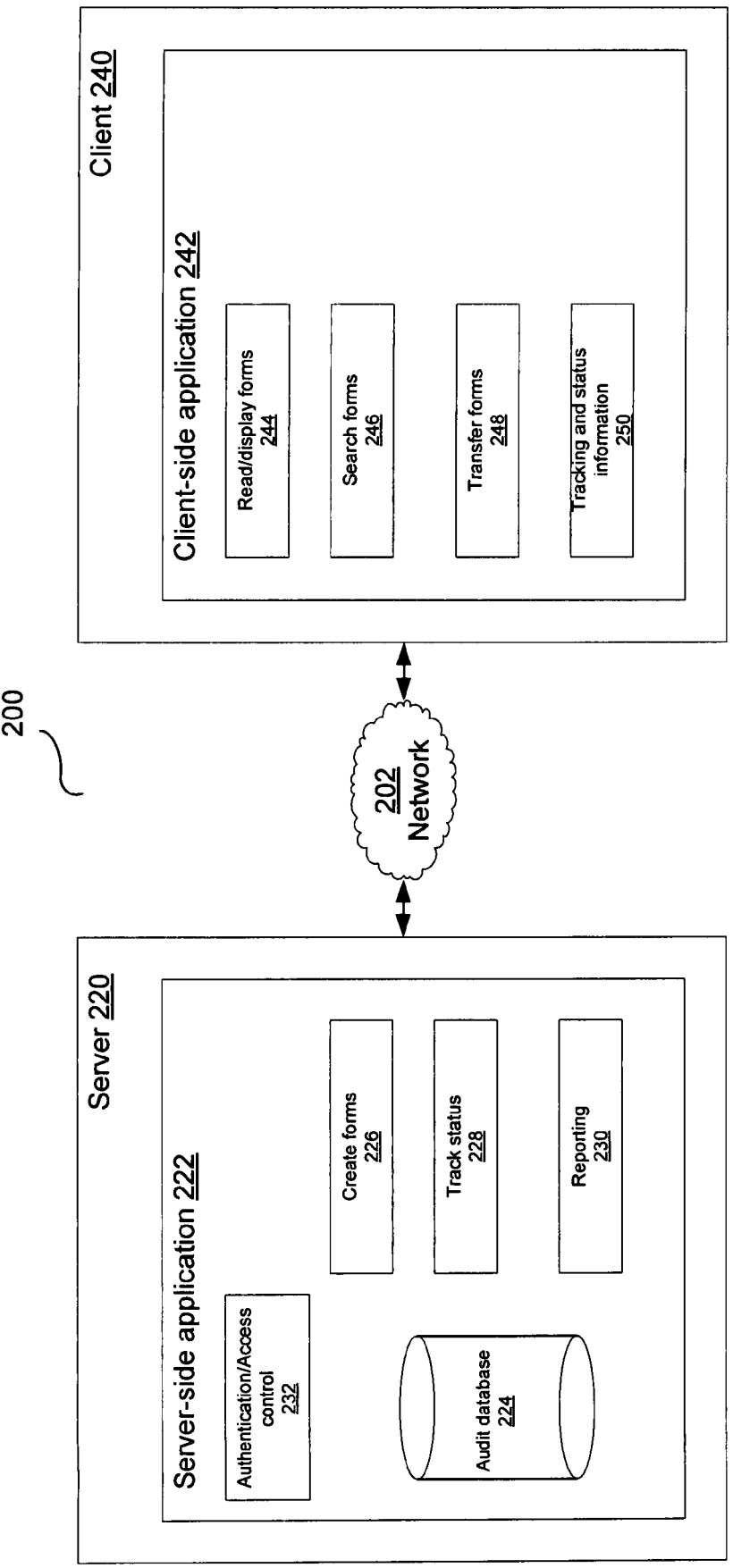
FIG. 2 depicts a block diagram of a utility pole auditing system in accordance with an illustrative embodiment.

With reference to FIG. 2, this figure depicts a block diagram of a utility pole auditing system in accordance with an illustrative embodiment. A utility pole auditing system is a system of hardware, software, and firmware that is usable for auditing utility poles. Auditing a utility pole is a process of collecting or updating information about a utility pole. An auditing process includes inspecting, testing, observing, and commenting on a subject of the audit. The auditing process further includes adding or updating information about the subject. An auditor is a person who performs the audit. An auditor is also known as an inspector, and an audit is also known as an inspection. Thus, a utility pole auditing system is a system of hardware, software, or firmware, usable for collecting or updating information about a set of utility poles. A set of utility poles is one or more utility poles.

The figure depicts system 200 as a client-server system. Network 202 is a network facilitating the communication between the client and the server in the depicted client-server system. Network 202 may be implemented using network 102 in FIG. 1.

Server 220 is the server component in the client-server system. Server 220 may be implemented using server 104 in FIG. 1. Application 222 is a server-side component of a software application for managing poles auditing information. Application 222 includes audit database 224 for storing information used in, generated during, or useful for auditing the utility poles. Audit database 224 may be implemented using a relational database, object-oriented database, flat-file, index-file, or other data storage suitable for this purpose.

Create forms component 226 is a software component that creates a set of audit forms that are used for auditing the utility poles. An audit form is an organization of information and information placeholders that can be used for auditing a set of utility poles. A set of audit forms is one or more audit forms. Track status component 228 is a software component that provides information about an open item in an audit of a utility pole. An open item is a notation in an audit form that has to be followed up with specific actions with respect to the utility pole in the audit form, but for which the follow-up action has not yet occurred. Reporting component 230 is a software component that generates reports from the audit information about a set of utility poles. Authentication and access control component 232 is a software component that manages access to the various server-side application functionality, for example, which user is allowed to create the forms, which user is allowed to update the audit database, and other similar access control functions known in the art.

Other components as well as other applications may execute on server 220. For example, an engineering work order application (not shown) may be running on server 220. Several applications may share components for performing common functions. For example, authentication and access control component may be shared between application 222 and an engineering work order application that may be running on server 220.

Furthermore, additional databases may be accessible from server 220. For example, an engineering work order database may include listing of utility poles in a region and may be located on, or be accessible from, server 220. Additionally, the engineering work order database in this example may be used for populating certain data in 224 audit database, as further described herein.

Client 240 is the client component in the client-server system. Client 240 may be implemented using client 114 in FIG. 1. Application 242 is a client-side component of a software application for managing poles auditing information. Application 242 includes several components as described below.

Read component 244 is a software component that reads and displays a set of audit forms that are used for auditing the utility poles. Search forms component 246 is a software component that searches for a suitable audit form for the auditing activity planned for a specific utility pole. Transfer forms component 248 is a software component that transfers updated audit forms to application 222 on server 220. An updated audit form is an audit form used during an audit, typically, with information that has been added or updated based on the audit. Track status component 250 is a software component that provides an auditor information about an open item in an audit of a utility pole.

Components in FIG. 2 have been chosen for the clarity of the description of the illustrative embodiment and are not limiting thereon. Many other components, in addition to or in substitution for, the components depicted in FIG. 2 are possible.

Figure 3:
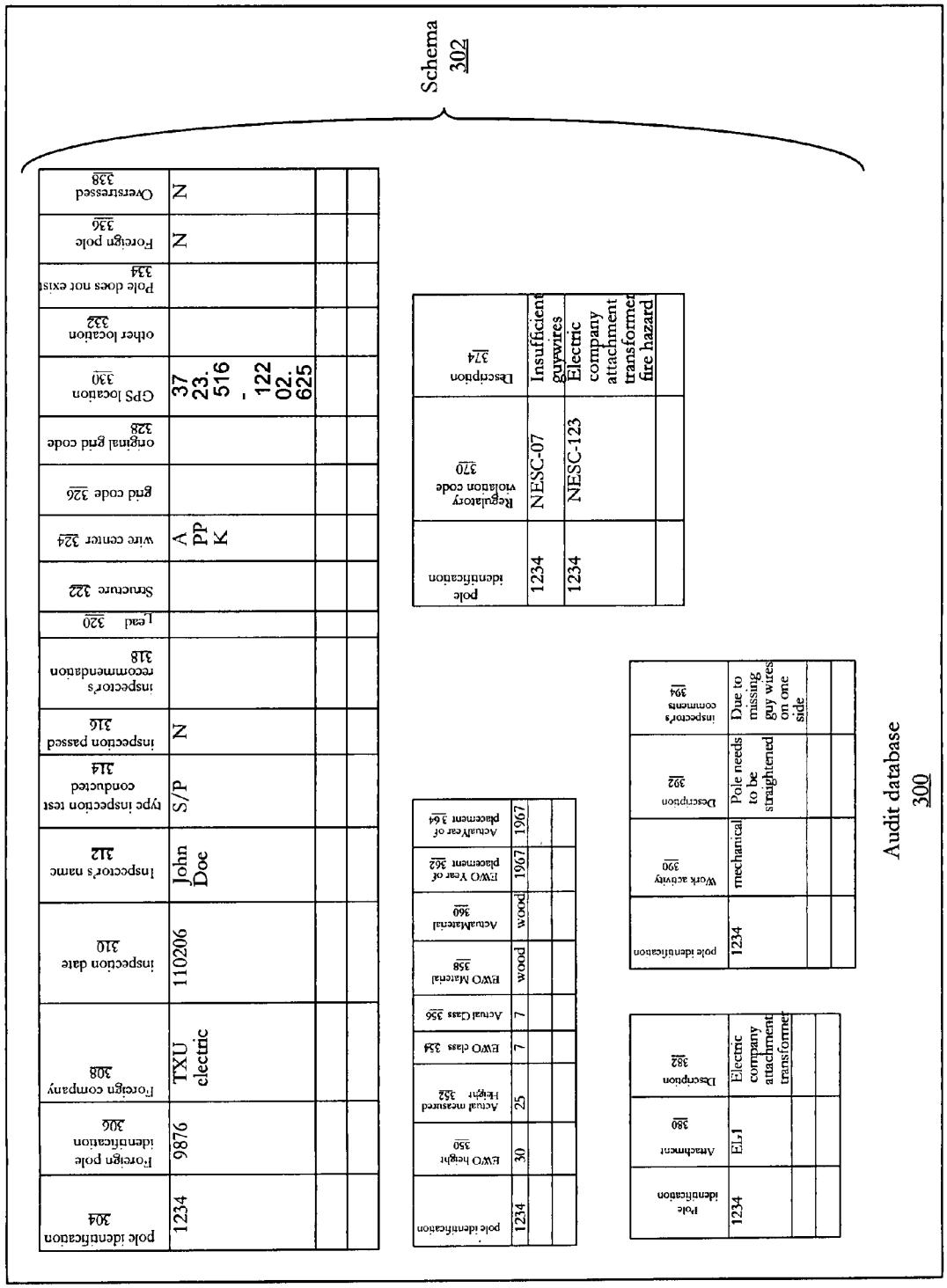
FIG. 3 depicts a schema of the audit database in accordance with an illustrative embodiment.

With reference to FIG. 3, this figure depicts a schema of the audit database in accordance with an illustrative embodiment. Audit database 300 can be implemented using audit database 224 in FIG. 2. Schema 302 is exemplary and includes data elements for illustration. A particular implementation of schema 302 may include more, less, or different data elements, organized differently than as illustrated in FIG. 3.

Data in data field 304 is "Pole identification," an identifier that uniquely identifies a utility pole in audit database 300. Generally, pole identification in data field 304 is an identifier assigned by the utility provider who owns the utility pole and the audit database 300. Pole identification in data field 304 may also be observable on the physical utility pole that is installed in the ground.

In some instances, an actual utility pole may have more than pole identifiers observable on the utility pole. For example, a telephone pole may have a pole identifier assigned by the telephone company as well as a pole identifier assigned by an electric company that a transformer attachment on the pole. Data in data field 306 is "Foreign pole identification," the pole identifier observed on a utility pole that is assigned by a non-owner of the utility pole, to-wit, an outside or foreign entity. Data in data field 308 is "Foreign company," the name or identifier of the foreign entity that assigned the foreign pole identification in data field 306.

Data in data field 310 is "Inspection date," a date of an inspection performed on the utility pole. Inspector's name in data field 312 is the name of the inspector who performed that inspection. Data in data field 314 is "Type inspection conducted," the type of that inspection. Data in data field 316 is an indication of whether the utility pole passed that inspection. Inspector's recommendation in data field 318 is the recommendation made by that inspector during that inspection.

Data in data field 320 is "Lead," which is the designation of a cable route normally based on a grid for a given wire center. Data field 322 describes the structure of that utility pole. Data in data field 324 is "Wire center." A wire center is a local office that manages the Public Switched Telephone Network of customers within a geographic boundary. A utility pole is generally assigned to a wire center and the wire center to which a utility pole is assigned generally has the management responsibility for that utility pole, such as for auditing, maintenance, repair, upgrades, and other activities relating to a utility pole. Grid code in data field 326 is the code assigned to the grid in a given wire center for a series of leads and pole numbers, generally called structures. A grid is a part of a network, such as a network of cables, through which utilities are distributed. Original grid code in data field 328 is the grid code that was originally assigned to the wire center.

GPS location in data field 330 is the global positioning system based location of the utility pole, and identifies the latitude and longitude coordinates at which the utility pole lies. Other types of location information for the utility pole, such as street intersections, may be stored in data field 332.

In some instances, a utility pole may be identified in a utility provider's information systems, but a corresponding physical pole may not exist on the ground. For example, this situation can arise if a physical pole existed in the identified location at one time, but was removed, such as for attaching that utility pole's cables to a nearby electric provider's pole. If the removal of the utility pole is not recorded in the utility provider's information system, the information system will continue to reflect the existence of a utility pole where none exists. Data field 334 is an indication that the utility pole does not exist as identified. The utility provider's information systems can be corrected using the indication in this data field.

Another type of discrepancy that may arise with respect to the physical poles is that a utility pole may be identified as the utility provider's own utility pole in the utility provider's information system, whereas on the ground, that utility pole may belong to another utility provider due to change in ownership, or due to an overbuild of and removal of the original pole. Data field 336 is an indication that the utility pole is a foreign utility pole. The utility provider's information systems can be corrected using the indication in this data field.

A utility pole may become overstressed due to natural reasons, overloading by attachments, or other reasons. Data field 338 indicates if the utility pole is overstressed.

An Engineering work order system (EWO) is an information system that is used for creating and specifying orders for work to be performed on the utility infrastructure, equipment, and technological and other assets. An engineering work order system of a utility provider may also serve as a record of property owned by the utility provider because a record of the utility provider's assets is available in the engineering work order system for creating work orders for those assets. The EWO may be separate or combined with the audit system.

However, an engineering work order database is generally separate from an audit database.

Data field 350 is "EWO height," the height of the utility pole as recorded in the engineering work order system. Data field 352 is "actual measured height," the actual height of the utility pole as measured in the field during an audit. Data field 354 is "EWO class," the class or category of the utility pole as recorded in the engineering work order system. Data field 356 is "actual class," the actual class or category of the utility pole as identified in the field during an audit.

Data field 358 is "EWO material," the material of construction of the utility pole as recorded in the engineering work order system. Data field 360 is "actual material," the actual material of construction of the utility pole as observed in the field during an audit. Data field 362 is "EWO year of placement," the year of placing the utility pole in service as recorded in the engineering work order system. Data field 364 is "actual year of placement," the actual year of placing the utility pole in service as identified in the field during an audit.

An auditor may find that a utility pole does not comply with a regulation or code. For example, a transformer attachment owned by an electric company and attached to a telephone pole owned by a telephone company may create a safety violation due to the manner of attaching the transformer to the pole. This and other conditions arising from the installation of the utility pole and the attachments thereon, may violate regulations or codes, such as those promulgated in the National Electrical Safety Code (NESC), or by a state's public utilities commission (PUC).

Data field 370 is "regulatory violation code," an indication of a violation of a regulation or code an auditor observes during an audit. Data field 374 holds any description associated with the regulatory violation code in data field 370. A utility pole can have none, one, or more violations that can be recorded in data fields 370 and 374.

Data field 380 is "attachments," a notation of an attachment that is attached to a utility pole. Data field 382 holds any description associated with the attachment identified in data field 380. A utility pole can have none, one, or more attachment that can be recorded in data fields 380 and 382.

Data field 390 is "work activity," a notation of a work activity that was performed, or is planned to be performed on a utility pole. Data field 392 holds any description associated with the work activity in data field 390. Data field 394 holds inspector's comments, which are the auditor's comments, on the work activity identified in data field 390. For example, an auditor may comment on the adequacy of the work activity that has already been performed on a utility pole, or may comment on special instructions for a work activity that is to be performed on the utility pole in the future. A utility pole can have none, one, or more work activities that can be recorded in data fields 390, 392, and 394.

In the exemplary schema 302 in FIG. 3, an exemplary Embarq®-owned utility pole number 1234 is shown as stored in the audit database as follows. Pole 1234 is identified under wire center APPK and has a foreign pole identification 9876 provided by foreign entity TXU Electric® company. Exemplary pole 1234 was inspected on Nov. 2, 2006, by auditor John Doe, who conducted a S/P type inspection test on the pole. The pole did not pass the inspection. The pole is located at 37 23.516 latitude, and 122 02.625 longitude. Pole 1234 is not a foreign pole, i.e., pole 1234 is owned by Embarq®, and the pole is not overstressed.

Pole 1234 is specified in the EWO system as 30 feet tall, whereas actual measurement by John Doe found the pole to be only 25 feet tall. The pole is correctly identified in EWO system as being of class 7, constructed of wood, and placed in service in 1967. Pole 1234 has two NESC violations, namely, NESC-07, which is due to insufficient guy wires securing the poles, and NESC-123, which indicates that the electric company's transformer attachment is a safety violation. The pole has one attachment EL-1, which is the electric company's transformer. Auditor John Doe identified that the pole is not true to the plumb line and needs to be straightened. Auditor John Does observed that the pole is leaning because of insufficient guy wires in one direction.

With reference to FIG. 4A, this figure depicts a schematic layout of a client side graphical user interface (GUI) in accordance with an illustrative embodiment. A particular implementation of the GUI may include, alter, combine, or delete the areas described below. The specific illustration of the GUI has been chosen for the clarity of the explanation of the illustrative embodiment.

GUI 400 includes area 402, which displays a searchable organization of poles in the network. The contents of area 402 may additionally be color coded, and may additionally be hierarchically arranged for facilitating the search.

GUI 400 further includes area 404, which displays or allows a user to input general information about a pole selected from area 402. For example, area 404 may display or allow a user to input the inspection date, pole number inspector's name, and other general information available for the selected pole.

GUI 400 further includes area 406, which displays or allows a user to input pole inspection information and data from any tests performed on the pole selected from area 402. For example, area 406 may display or allow a user to input the height, class, material of the pole, and the type of test performed along with the test results for the selected pole.

GUI 400 further includes area 408, which displays or allows a user to input information about attachments on the pole selected from area 402. For example, area 408 may display or allow a user to input the number and type of attachments, nature of attachments, and any regulatory violations caused by the attachments for the selected pole.

GUI 400 further includes area 410, which displays or allows a user to input inspector's notes and actions to be taken on the pole selected from area 402. For example, area 410 may display or allow a user to input the specific instructions about the work activities to be performed on the selected pole.

Figure 4B:
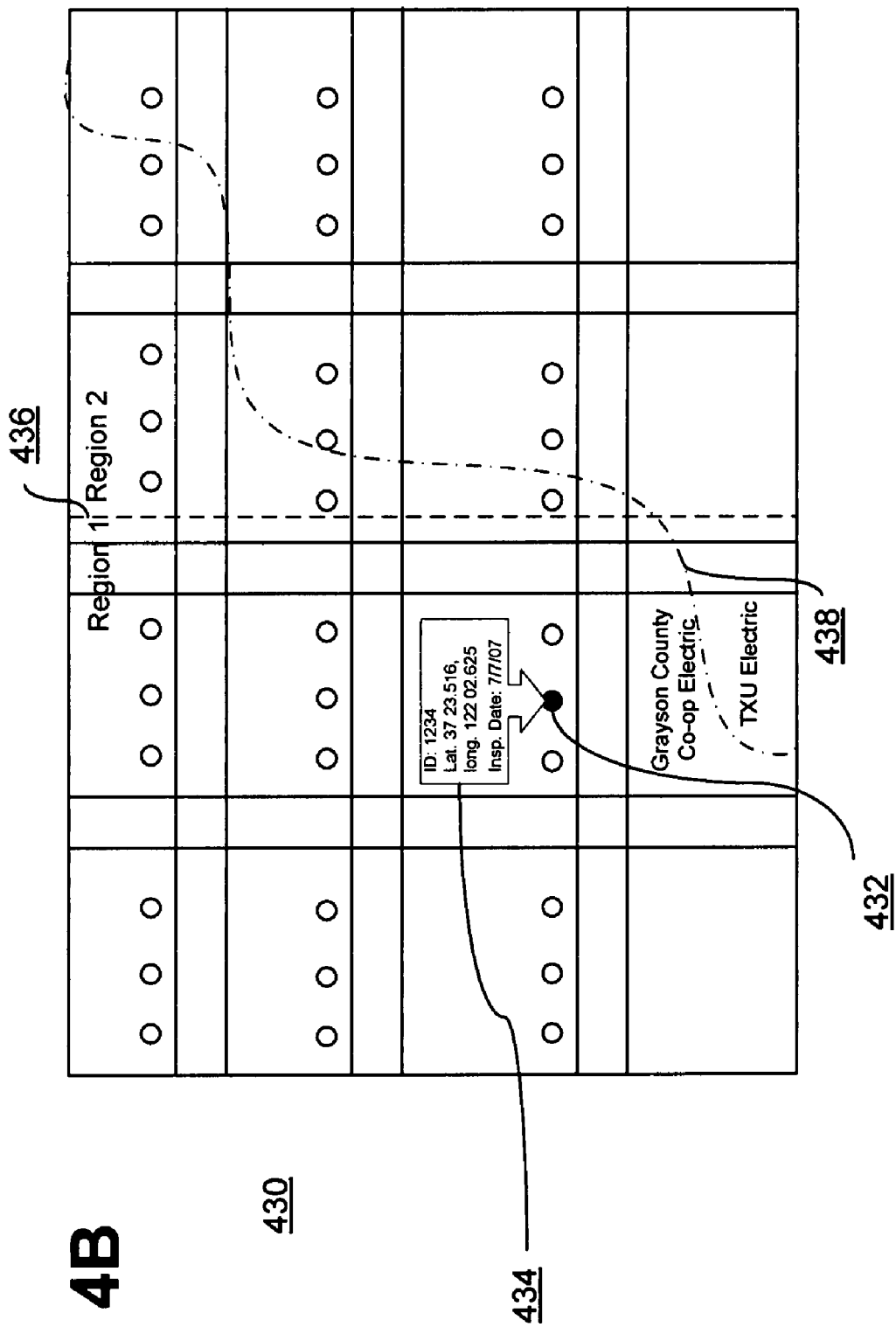
FIG. 4B depicts an exemplary detailed layout of a client side GUI in accordance with an illustrative embodiment.

With reference to FIG. 4B, this figure depicts an exemplary map layout of a client side GUI in accordance with an exemplary embodiment. GUI 430 depicts a utility pole audit map that shows an approximate relative location of the various utility poles, such as pole 432. When an auditor selects a utility pole, brief information, such as information 434 may be displayed on the map. Demarcations, such as demarcation 436 may be displayed to separate regions within a wire center, or separate wire centers when two or more wire centers are displayed.

Additionally, GUI 430 may also show a boundary map using boundary map lines, such as boundary map line 438, which may inform the auditor about a likely entity who may install an attachment to a utility pole. GUI 430 shows that TXU Electric® is the electric provider to the East of boundary map line 438, and Grayson county co-operative electric company is the electric provider to the West. From a boundary map available in this manner, an auditor can determine which entity may have placed an attachment, such as an electric transformer on a utility pole.

GUI 430 is only exemplary. Many variations of GUI 430 with more, fewer, or different pieces of information may be implemented in accordance with the illustrative embodiments.

With reference to FIG. 4C, this figure depicts an exemplary detailed layout of a client side GUI in accordance with an illustrative embodiment. GUI 450 depicts area 452 that shows a hierarchical organization of poles, similar to the description of area 402 in FIG. 4A. GUI 450 depicts area 454 that shows general information about a selected pole, similar to the description of area 404 in FIG. 4A. GUI 450 depicts area 456 that shows pole audit information and data from any tests performed on the selected pole, similar to the description of area 406 in FIG. 4A. GUI 450 depicts area 458 that shows information about attachments on the selected pole, similar to the description of area 408 in FIG. 4A. GUI 450 depicts area 460 that shows the auditor's notes and actions to be taken on the selected pole, similar to the description of area 410 in FIG. 4A.

Note that the illustration of GUI 450 is exemplary and not intended to be limiting on the illustrative embodiments. A particular GUI may be designed with many variations to the exemplary illustration depicted in FIG. 4C.

In one implementation of the illustrative embodiments, when a pole fails an audit inspection, the client side application according to the illustrative embodiments may provide the auditor with several options for identifying the issues that have to be resolved. For example, the auditor may type in the recommended course of action in a user-input area. The auditor may additionally specify additional work comments in another user-input area. The auditor may also have several common issues identified in a check-off type list. For example, a list may have checkboxes next to several common audit issues such as straighten pole, place new pole, transfer attachments, remove old pole, place or replace anchor, place or replace guy, rearrange attachments, correct NESC deviation, duplicate pole to be transferred, duplicate pole to be removed, CATV or other auxiliary guy attachment on anchor, and other audit issues.

Additionally, the client application may allow an auditor to provide more information when a NESC violation or other regulatory violation exists. For example, drop down menus may allow the auditor to select a category of violation, sub-category of violation, specific violation, number of technicians estimated to resolve the issue, number of hours estimated to resolve the issue, date the issue was identified, date by which the issue has to be resolved, and other details relating to NESC and other violations. Auditor's ability to use the client side application for providing details of violations as described above may facilitate better management and coordination of the issues resolution process.

Furthermore, when the completed audit form is uploaded and recorded in the audit database, a number of activities may take place as a result of the upload. For example, the server-side application may cause a connection to an irregular plant condition (IPC) database to be created. The server-side application may then use the audit information entered by the auditor to create an IPC ticket. As another example, the audit database may record the IPC ticket number to enable tracking the status of the IPC. As another example, the reporting functionality of the server-side application may allow supervisors to monitor, prioritize, and respond to resolve the identified issues.

Figure 5:
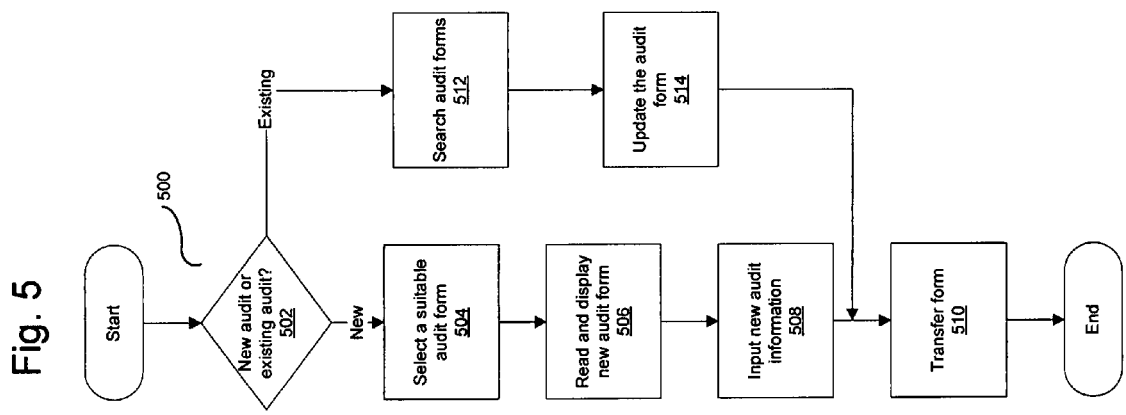
FIG. 5 depicts a flowchart of an auditing process in accordance with an illustrative embodiment.

With reference to FIG. 5, this figure depicts a flowchart of an auditing process in accordance with an illustrative embodiment. Process 500 may be implemented using client-side application 242 in client 240 in FIG. 2.

The process begins by determining whether a new audit is to be performed or an existing audit is to be updated (step 502). If a new audit is to be performed ("New" path of step 502), the process selects an audit form that is suitable for the audit of a selected pole (step 504). The selected audit form is read and displayed so that the auditor may have access to the existing data for the audit and may input additional data from the audit (step 506). The process accepts new audit information in the displayed audit form (step 508).

Once the auditor indicates that the audit form can be transmitted, the process transmits the form (step 510). The process ends thereafter. Note, however, that the transfer of the audit form from the client-side application to the server-side application is dependent on the method of communication used. For example, if the communications method allows connecting to the server-side application, such as by using a wireless connection to the Internet, the transfer may occur shortly after the auditor indicates that the audit form may be transmitted. Such a connectivity is called online connectivity. On the other hand, if the client-side application cannot connect to the server-side application when the auditor indicates that the audit form may be transmitted, the transmission may occur at a later time, such as in a nightly batch processing, or when the client device can establish communications with the server. Such connectivity is called offline connectivity.

Returning to step 502 of process 500, if the process determines that an existing audit is to be updated ("Existing" path of step 502), the process searches for the audit form that is to be used for updating (step 512). The process then updates the audit form (step 514). The updated audit form is transmitted in the manner described above with respect to transmitting a new audit form (step 510). The process ends thereafter.

Figure 6:
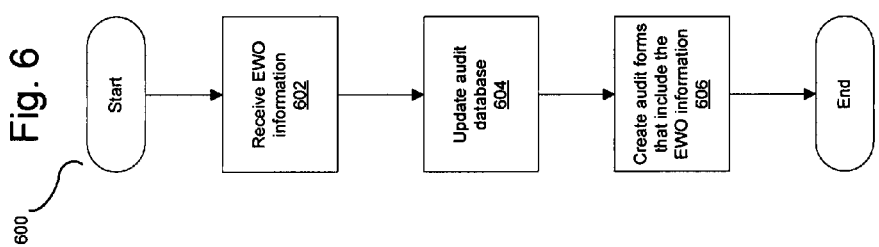
FIG. 6 depicts a flowchart for a process for using data from an engineering work order system for auditing in accordance with an illustrative embodiment.

With reference to FIG. 6, this figure depicts a flowchart for a process for using data from an engineering work order system for auditing in accordance with an illustrative embodiment. Process 600 may be implemented using server application 222 in server 220 in FIG. 2.

Process 600 begins by receiving EWO information from an EWO system (step 602). The process then updates an audit database, such as audit database 224 in FIG. 2, with the information received from the EWO system (step 604). The process uses the information received from the EWO system in this manner, for creating a set of audit forms that may be used for auditing utility poles (step 606). A set of audit forms is one or more audit forms. The process ends thereafter.

In one embodiment, an auditor may download pole information from the audit database to a mobile computing device, such as information for poles to be inspected during one or more days. The downloaded information may allow the auditor to perform audits without having access to a network from the pole location, such as by using an offline application as understood in the art. Alternatively, if connectivity to a network is available at the pole location, such as wireless access to network 102 in FIG. 1, the auditor may access the pole specific information in the audit database while near the utility pole using an online application, as understood in the art. A client application, such as client 240 in FIG. 2, may be usable as an offline application or an online application.

In using the EWO information, the audit forms may be populated with the EWO information. By populating the audit forms, the auditor may save time during the audit by being able to verify the pre-populated information rather than having to input the information. By using the information from both the audit database and the EWO database, the auditor may be able to standardize with other organizations within a company, or may be able to use information that is consistent from one system to another.

Figure 7:
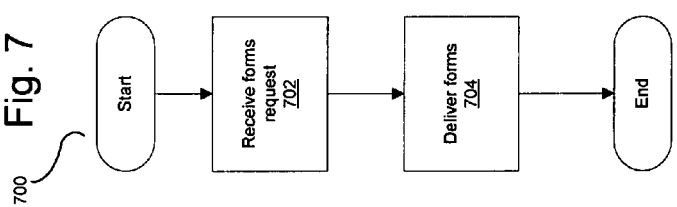
FIG. 7 depicts a flowchart for a process for providing audit forms in accordance with an illustrative embodiment.

With reference to FIG. 7, this figure depicts a flowchart for a process for providing audit forms in accordance with an illustrative embodiment. Process 700 may be implemented using server application 222 in server 220 in FIG. 2.

Process 700 begins by receiving a request for audit forms (step 702). In one implementation of the illustrative embodiment, step 702 may result from the execution of steps 502 and 504 in process 500, which may be implemented in a client-side application. In response to the request received in step 702, the process delivers a set of audit forms (step 704). The process ends thereafter.

Figure 8:
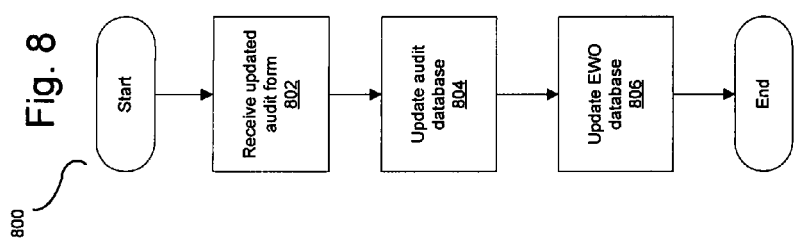
FIG. 8 depicts a flowchart for a process for updating audit information in accordance with an illustrative embodiment.

With reference to FIG. 8, this figure depicts a flowchart for a process for updating audit information in accordance with an illustrative embodiment. Process 800 may be implemented using server application 222 in server 220 in FIG. 2.

Process 800 begins by receiving an updated audit form (step 802). The process may receive one or more updated audit forms in step 802 in a particular implementation, such as when a client-side application transfers several audit forms in a batch or offline transfer. The process then updates an audit database, such as audit database 224 in FIG. 2, with the information in the updated audit form (step 804). The process uses the information received in this manner to update an EWO system, such as the EWO system that provided information in step 602 in process 600 in FIG. 6 (step 806). The process ends thereafter.

In one embodiment, the EWO may be updated or otherwise synchronized periodically, for example, daily. In another embodiment, the EWO may be updated or otherwise synchronized non-periodically, for example, in response to an update to the audit database. Furthermore, an update may include all information or only the updated information resulting from an audit. Many other variations of the update are contemplated within the scope of the illustrative embodiments.

The steps identified and described in processes 500, 600, 700, and 800 are described only as exemplary. A particular implementation of any of these processes may combine, remove, further divide, alternatively implement, or include additional functionality as compared to the processes as defined in the illustrative embodiments.

Thus, in the illustrative embodiments described above, a computer implemented method, apparatus, and computer program product are for auditing utility poles. Using the illustrative embodiments, a utility provider, or their auditors can audit the utility pole assets in a manner more effectively than auditing without the benefit of the illustrative embodiments. Using the illustrative embodiments, auditors can have access to information existing in an EWO system at the time of an audit. Such information can be pre-populated in the audit forms, which reduces the need to reassess and retype information in the field. Illustrative embodiments also allow an auditor to verify the accuracy of the information in the EWO system. Upon verification, the auditor can update an audit system as well as the EWO system so that the EWO system has the updated and accurate information from the field. Having updated and accurate information from the field in the EWO system improves the accuracy and effectiveness of any work that is later performed on the utility pole by other personnel.

The illustrative embodiments can take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

The above description has been presented for purposes of illustration and description, and is not intended to be exhaustive or limited to the illustrative embodiments in the form disclosed. Many modifications and variations will be apparent to those of ordinary skill in the art.

What is claimed:

1. A method for managing utility pole information, the method comprising:

creating a plurality of audit forms;

searching for an audit form from the plurality of audit forms for an audit of a selected pole;

pre-populating the audit form with data from a repository of engineering work orders;

recording utility pole audit information of the selected pole audited by an auditor on the audit form;

determining if the selected pole has been previously audited;

searching for an audit form including audit information about the selected pole if the selected pole has been previously audited;

tracking an open item in the audit information;

updating the audit information;

forming an updated audit form;

transferring the updated audit form to a repository of utility poles audit information; and controlling user access for creating and searching functions.

2. The method of claim 1, further comprising: generating a report from at least one of the repository of utility poles audit information and repository of engineering work orders.

3. The method of claim 1, wherein transferring the updated audit form to a repository of utility poles audit information includes transferring updates of:

an inspection date;

one of a company pole identification, and a foreign pole identification;

a lead;

a pole structure;

a wire center, one of a grid code, and an original grid code;

one of a global positioning location, and other location information;

an inspector's name;

a status of the utility pole wherein the status indicates one of a non-existence of the utility pole, and the utility pole being a foreign pole;

a height of the utility pole in an engineering work order;

a measured height of the utility pole;

a class of the utility pole in the engineering work order;

a material of the utility pole in the engineering work order;
a year of placement of the utility pole in the engineering work order;
an indication of a type inspection test conducted;
an indication of one of inspection passed, and inspection failed;
an indication of the utility pole being one of overstressed and not overstressed;
notations of a set of regulatory violations;
data for a set of attachments on the utility pole;
a set of work activities to be performed on the utility pole;
a notation of the inspector's recommendation; and
a notation of the inspector's comments on the set of work activities.

4. The method of claim 1, further comprising updating the repository of engineering work orders using the updated audit form.

5. The method of claim 1, further comprising: generating an improper plant condition ticket if the completed audit form includes an indication of a regulatory violation.

6. The method of claim 1, further comprising determining an entity based on a boundary map that identifies the entity likely to install the attachment in a given geographical area.

7. The method of claim 1, further comprising:
comparing the first attachment information of the selected pole to a second attachment information of the selected pole in a database; and
adjusting billing and taxation information based on a difference between the attachment information and the second information.

8. The method of claim 1, wherein the utility pole audit information includes general pole information, a pole inspection information, a pole test information, a first attachment information, and inspector's notes about the selected pole.

9. A system for managing utility pole information, the system comprising:
a first database configured to manage information associated with a plurality of utility poles, wherein the first database is an engineering work order database;
a first processing unit in communication with the first database and configured to extract at least a portion of the information in the first database to form extracted information;
a second database in communication with the first processing unit and configured to store the extracted information, wherein the second database includes additional fields of information not included in the first database, and wherein the additional fields include at least one of information for corrective action to a utility pole, and information of a utility pole not complying with a regulatory standard;
a second processing unit in communication with the second database and configured to execute a software program that, when executed by the second processing unit, causes a graphical user interface to be presented to a user to verify and update the utility pole information stored in the second database; and
a third processing unit in communication with the first database and configured to generate at least one report.

10. The system of claim 9, wherein the second processing unit operates within a portable computing device, the system further comprising: a third database operating in the portable computing device and configured to store at least a portion of the information in the second database.

11. The system of claim 10, wherein the second processing unit is configured to operate with the third database, and at least one of update the information in the second database and update the information in the third database.

12. The system of claim 9, wherein the second processing unit is configured to update the first database with updated information in the second database.

13. The system of claim 9, wherein the extracted information includes a global positioning information associated with a location of a utility pole.

14. A method for managing utility pole information, the method comprising:
managing information associated with a plurality of utility poles in a first database, wherein the first database is an engineering work order database;
extracting using a first processing unit in communication with the first database, at least a portion of the information in the first database to form extracted information;
storing the extracted information in a second database in communication the first processing unit, wherein the second database includes additional fields of information not included in the first database, and wherein the additional fields comprise at least one of information for corrective action to a utility pole, and information of a utility pole not complying with a regulatory standard;
updating the first database with updated information in the second database, using the second processing unit;
presenting a graphical user interface to a user to verify and update the utility pole information stored in the second database using a second processing unit in communication with the second database; and
generating at least one report using a third processing unit in communication with the first database.

15. The method of claim 14, wherein the second processing unit operates within a portable computing device, the method further comprising: storing at least a portion of the information in the second database in a third database operating in the portable computing device.

16. The method of claim 15, further comprising: updating at least one of the information in the second database and the information in the third database, using the second processing unit configured to operate with the third database.

17. The method of claim 15, wherein the extracted information includes a global positioning information associated with a location of a utility pole.

* * * * *